No. 837,106. PATENTED NOV. 27, 1906.
L. ONDERDONK & R. G. WOODWARD.
OVERSEAMING MACHINE.
APPLICATION FILED NOV. 9, 1901.
7 SHEETS—SHEET 1.
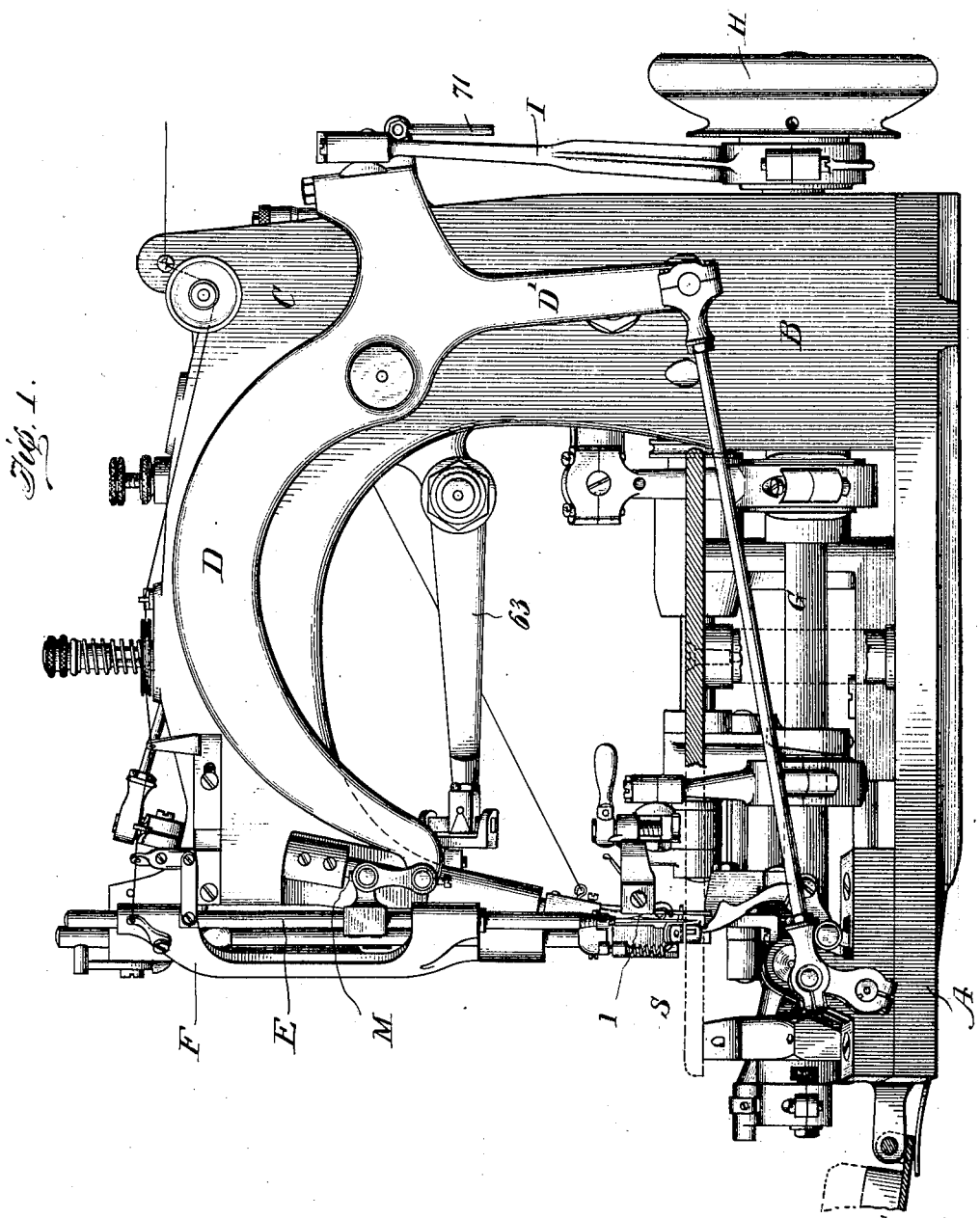

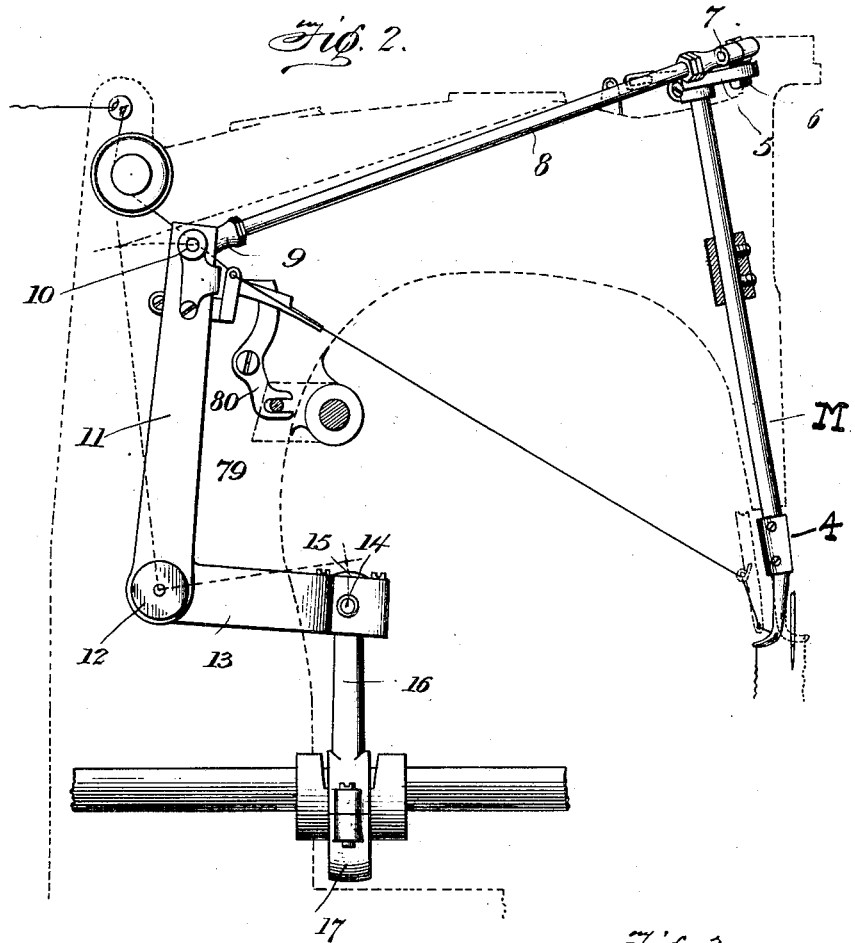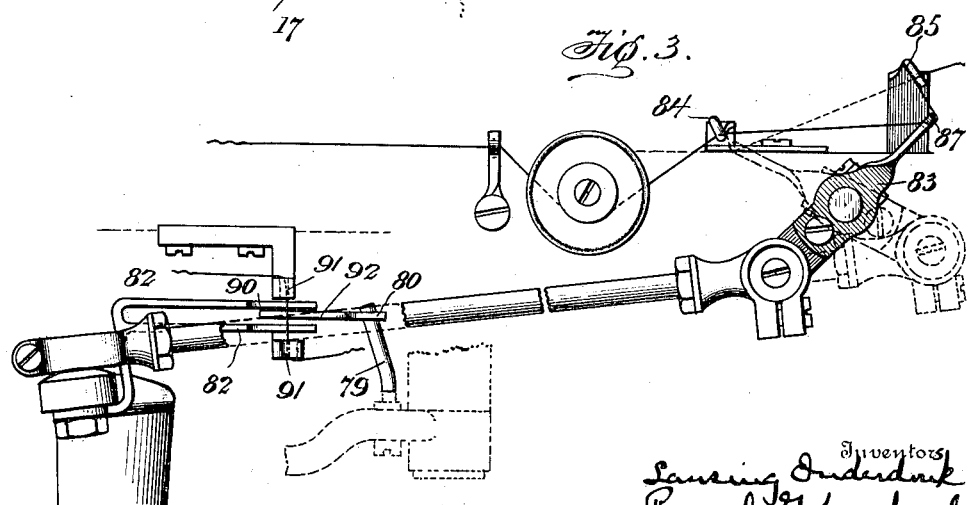

No. 837,106. PATENTED NOV. 27, 1906.
L. ONDERDONK & R. G. WOODWARD.
OVERSEAMING MACHINE.
APPLICATION FILED NOV. 9, 1901.
7 SHEETS—SHEET 3.
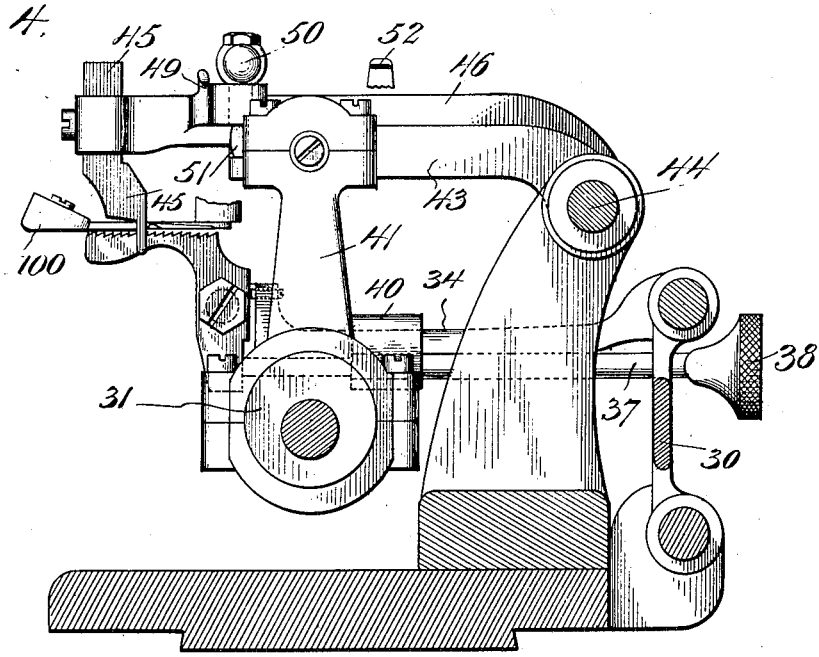
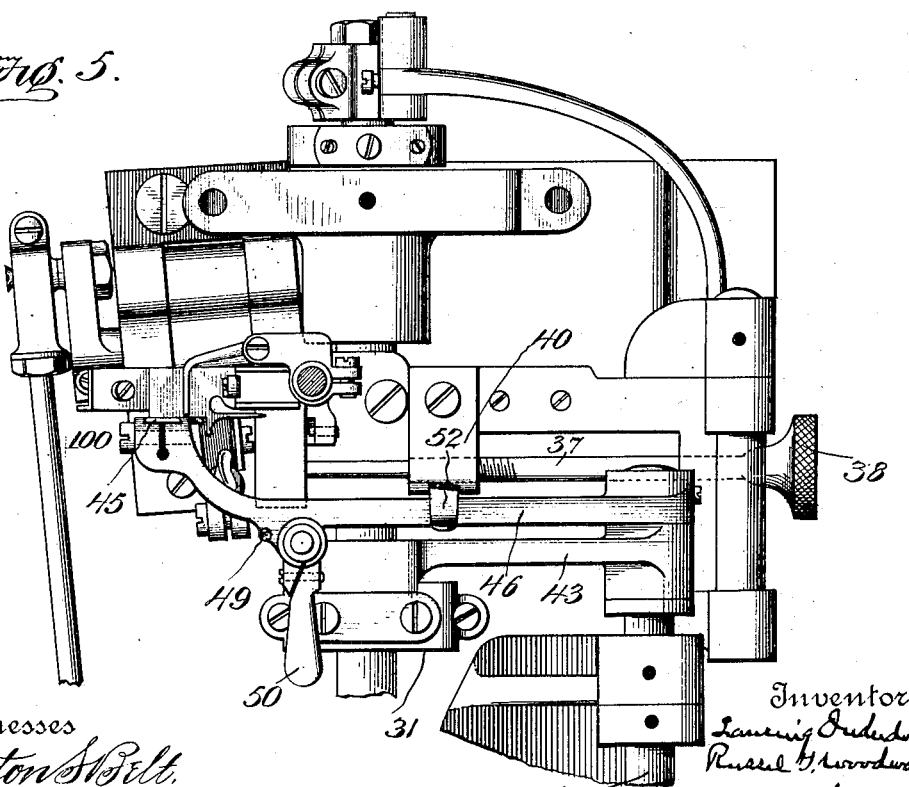

No. 837,106. PATENTED NOV. 27, 1906.
L. ONDERDONK & R. G. WOODWARD.
OVERSEAMING MACHINE.
APPLICATION FILED NOV. 9, 1901.

7 SHEETS—SHEET 4.

Witnesses
Fenton S. Belt.
Grace P. Brereton

Inventors
Lansing Onderdonk
Russel G. Woodward
By Shutwood & Greeley
Attorneys

No. 837,106. PATENTED NOV. 27, 1906.
L. ONDERDONK & R. G. WOODWARD.
OVERSEAMING MACHINE.
APPLICATION FILED NOV. 9, 1901.
7 SHEETS—SHEET 5.
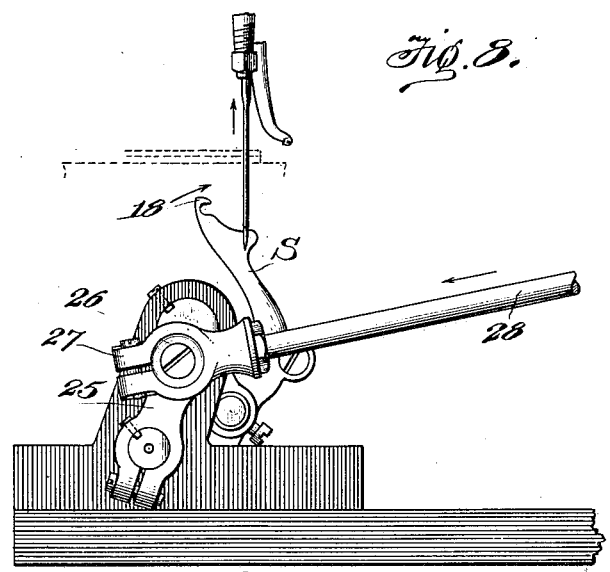
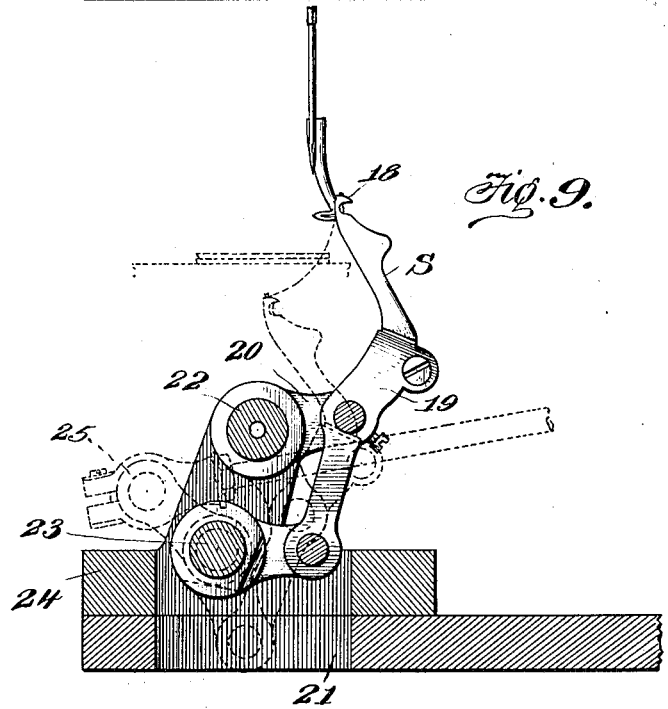

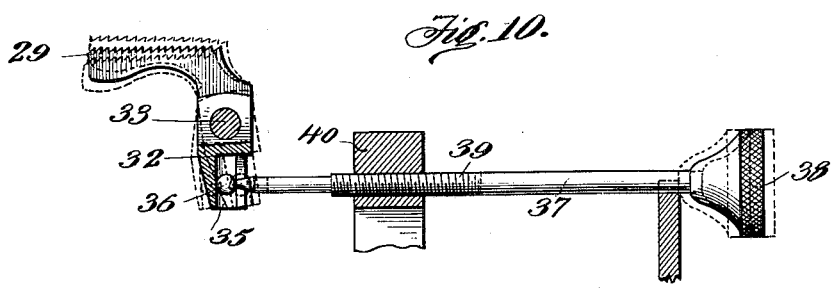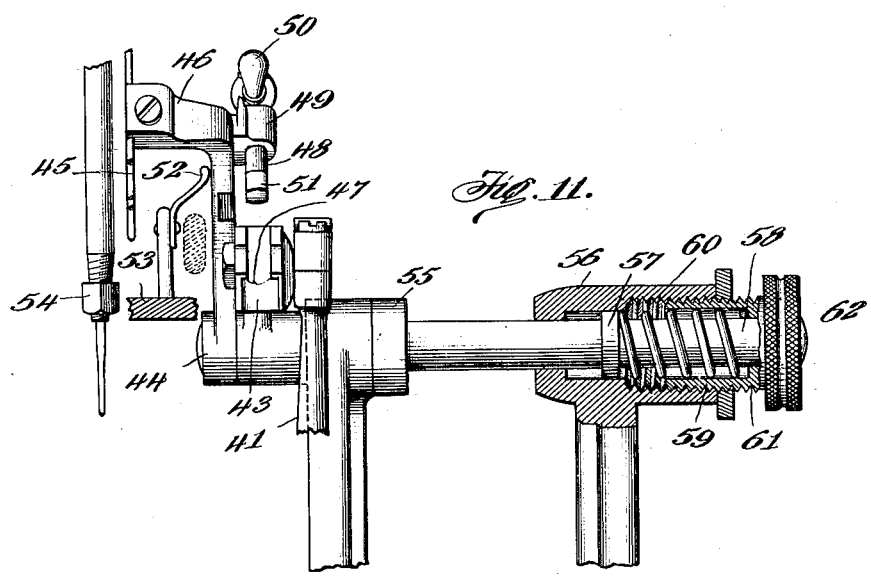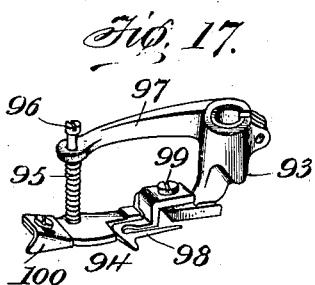

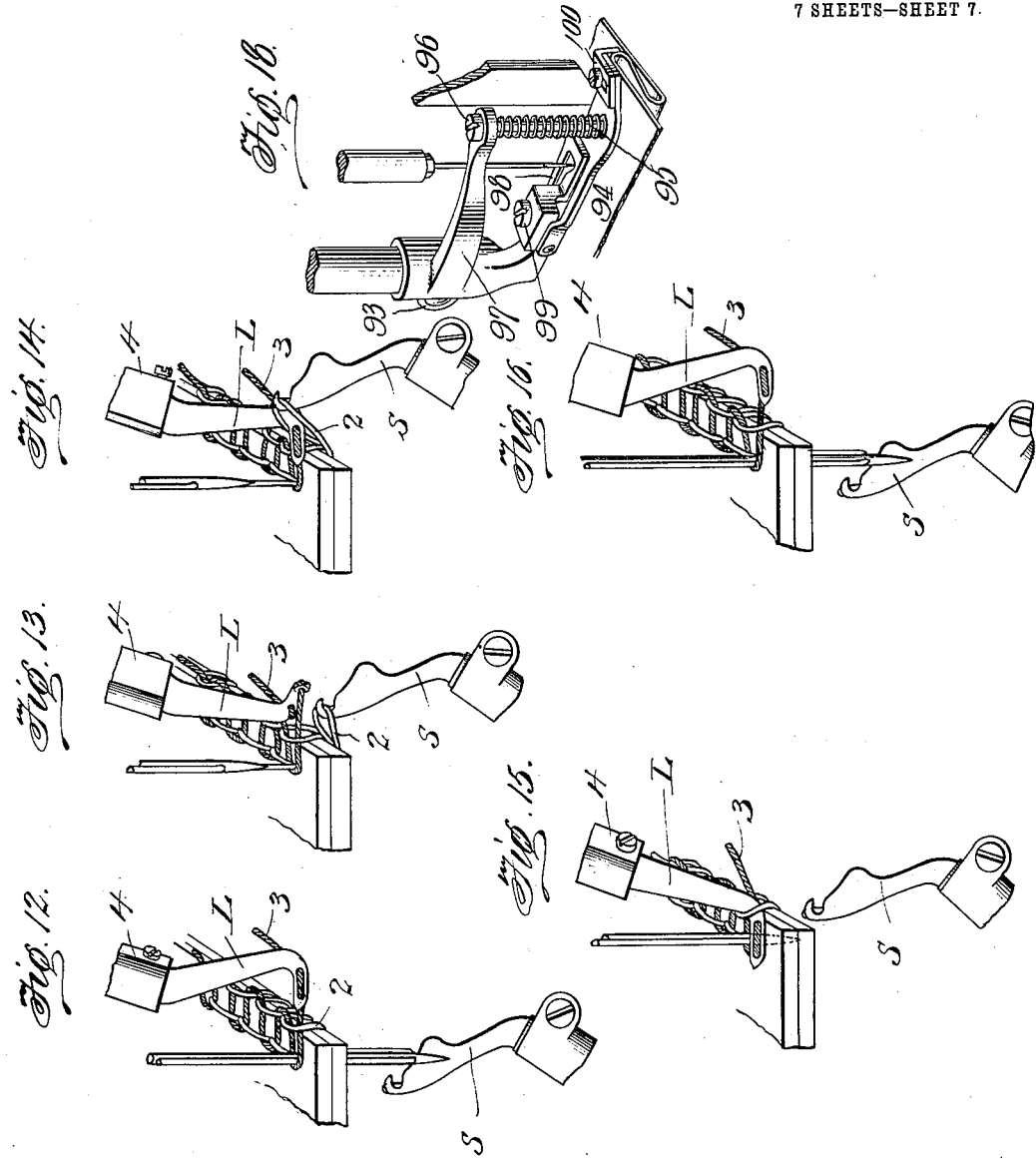

UNITED STATES PATENT OFFICE.

LANSING ONDERDONK, OF NEW YORK, N. Y., AND RUSSEL G. WOODWARD, OF WAUKEGAN, ILLINOIS, ASSIGNORS TO UNION SPECIAL SEWING MACHINE CO., OF CHICAGO, ILLINOIS, A CORPORATION OF ILLINOIS.

OVERSEAMING-MACHINE.

No. 837,106.　　　Specification of Letters Patent.　　　Patented Nov. 27, 1906.

Application filed November 9, 1901. Serial No. 81,772.

*To all whom it may concern:*

Be it known that we, LANSING ONDERDONK, residing at New York, in the county of New York and State of New York, and RUSSEL G. WOODWARD, residing at Waukegan, in the county of Lake, State of Illinois, citizens of the United States, have invented certain new and useful Improvements in Overseaming-Machines, of which the following is a description, reference being had to the accompanying drawings and to the letters and figures of reference marked thereon.

Our invention relates to an improvement in overseaming-machines of that type particularly in which the overedge stitches are formed from two threads, carried, respectively, by a vertically-reciprocating eye-pointed thread-carrying needle and a looper and in which the loops of needle-thread are taken from the needle below the work-plate by a spreader or looping-hook and carried out beyond the edge of the throat-plate in such position as to be entered above the material by the thread-carrying looper, which thread-carrying looper presents its thread in such position that the needle will pass through loops of looper-thread, thus making an overedge seam suitable for ornamenting edging or for uniting edges of superposed pieces of material.

The object of the present invention is to provide a novel construction of overseaming-machine which is adapted to run at high speed and which shall be strong and durable.

The invention consists in the various details of constructions and arrangements of parts, all as hereinafter described, and referred to in the appended claims.

The invention is illustrated in the accompanying drawings, in which—

Figure 6:
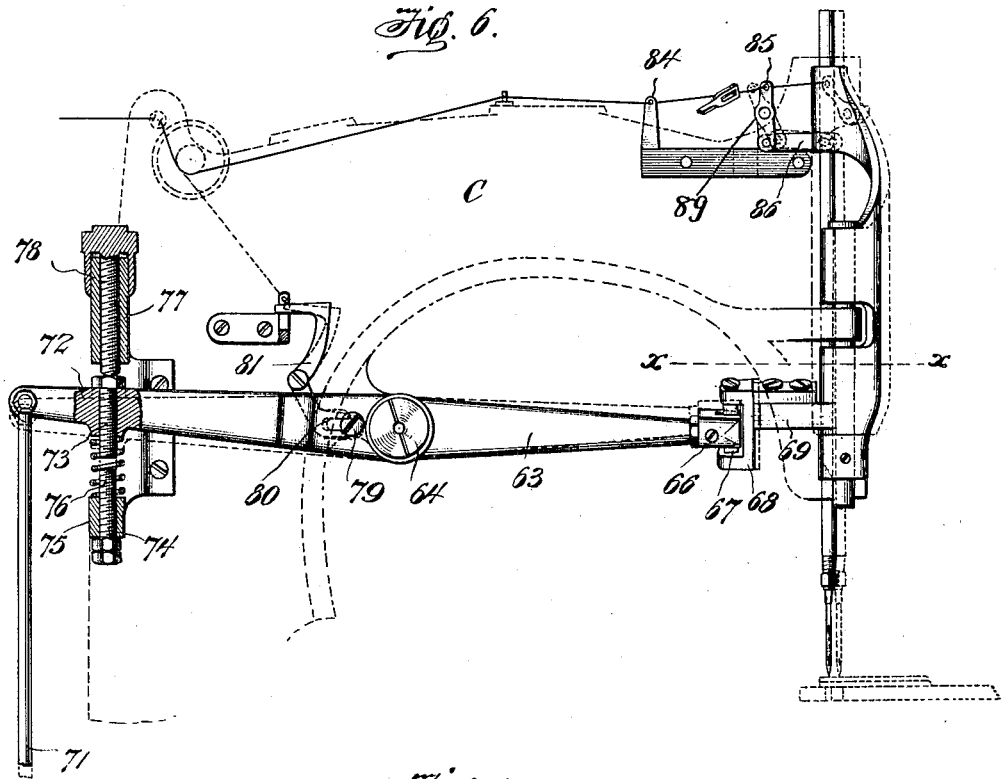
Figure 7:
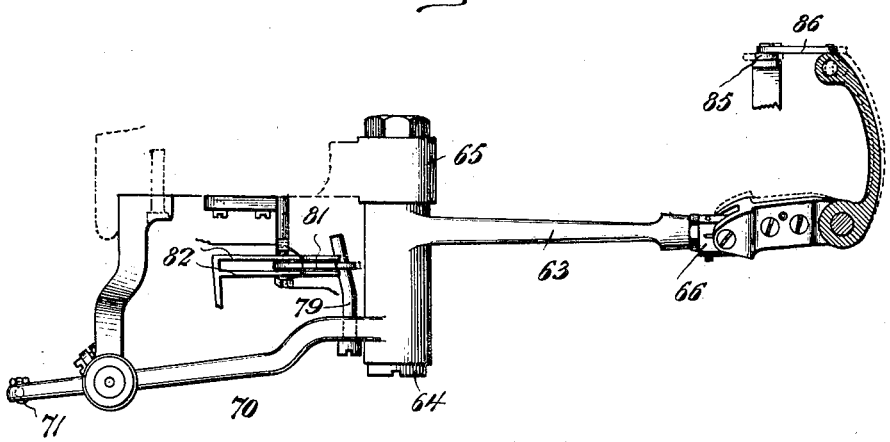

Figure 1 is a side elevation of a sewing-machine constructed in accordance with my invention. Fig. 2 is a skeletonized view of the rear part of the machine, showing the mechanism for operating the looper and the pull-offs and take-ups for the needle and looper threads, respectively. Fig. 3 is a top plan view of Fig. 2. Fig. 4 is a cross-section taken through the bed of the machine looking toward the head of the machine and showing the trimmer and feed mechanisms. Fig. 5 is a plan view of Fig. 4. Fig. 6 is a rear view of the machine, illustrating particularly the mechanism for shifting the needle-bar gate or frame. Fig. 7 is a plan view of the same, the frame of the machine being removed and the forward part being shown in section. Figs. 8 and 9 are detail enlarged views, showing the looping-hook or spreader-operating mechanism in various positions and the corresponding positions of the needle and looper. Fig. 10 is a side view, partly in section, of the feed-dog and its adjusting-screw. Fig. 11 is a detached view, partly in section, illustrating the trimmer mechanism. Figs. 12 to 16, inclusive, represent the various positions of the looper, spreader, and needle in the operation of forming the stitch, which stitch applied to two superposed pieces of fabric is also illustrated in said figures. Fig. 17 is a detail perspective view of the presser-foot. Fig. 18 is a perspective view showing the presser-foot and guide, the trimmer, and the fabric and needle in their proper relations.

In general the shape of the machine is of the well-known Union Special type, the bed-plate A, standard B, gooseneck C, needle-lever D, needle-bar E, needle-bar-supporting gate or frame F, as well as other customary parts, being of the usual construction. The driving-shaft G carries on its outer end the belt-pulley H, to which power is applied, and through the usual eccentric-strap I motion is transmitted to the needle-lever D.

The stitch-forming elements of the machine comprise, as herein shown, a vertically-reciprocating thread-carrying eye-pointed needle 1, which carries a thread down to the material and in its upward movement throws out a loop 2, which loop is seized by a spreader or looping-hook S and carried laterally to a point above the cloth-plate of the machine, where it is engaged by an oscillating looper L, mounted on a shaft M, supported entirely above the cloth-plate of the machine, which shaft is oscillated to carry a loop of thread 3 through the needle-loop and into position to be engaged by the needle in its next descent, thus making the overedge stitch illustrated in Figs. 12 to 16 of the drawings.

The particular looper movement which we have preferred to adopt in this machine and which is shown by way of illustration is the invention of Lansing Onderdonk, one of the parties to this application, and is shown, described, and claimed in an application filed by him on the 9th day of November, 1901, Serial No. 81,761.

Referring now to the drawings for a showing of the looper mechanism, said looper L carries a thread 3, and at its upper end or shank is secured in a collar 4, clamped to the lower end of the shaft M, which is arranged at an inclination to the cloth-plate and slightly off the vertical, passing through openings in the head of the machine, which form bearings for it. At its upper end the looper-supporting shaft is fitted into a socket on the clamping head or block 5, provided at the forward end with a ball-stud 6, over which loosely fits a head 7, to which one end of the pitman-rod 8 is attached. This pitman-rod 8 at its opposite end is screwed into a socket on a head 9, fitting a ball-stud 10, carried upon the end of the vertical arm 11 of the bell-crank lever, pivoted at 12 to the machine-standard B. The horizontal arm 13 of said bell-crank lever carries a ball-stud 14, upon which is fitted a head 15, located upon the upper end of a connecting-rod 16, which embraces the eccentric 17 upon the driving-shaft of the machine. In the rotation of the driving-shaft the inclined shaft which supports the looper is oscillated, carrying the looper from a point in rear of and to one side the needle around in a curved path inclined to the cloth-plate through the needle-loop, which has been brought by the spreader or looping-hook up into the path of said looper and around in front of the needle, so that the needle in its descent passes through the loop carried on the looper, thus making an overedge stitch.

The spreader or looping-hook is shown particularly in Figs. 8 and 9 and is provided on its upper end with a hook or beak 18, adapted to seize the loop of needle-thread. Its lower end or shank is clamped into the upper end of an arm 19, pivotally supported upon the two cranks 20 and 21, which in turn are supported upon rocking shafts 22 23, journaled in bearings in a bracket 24, secured to the bed of the machine. The lower crank-shaft has secured to it a crank-arm 25, provided with a ball-stud 26, over which is fitted the head 27 of the pitman-rod 28, connected at its opposite end to the lower end of the needle-lever extension D'.

As shown in Fig. 8, the needle is just beginning its upward movement and the spreader its upward forward movement, while in Fig. 9 the spreader has reached the limit of its upward and forward movement, the looper has passed into the needle-loop on the spreader, which latter is about to recede therefrom, and the needle is about to begin its descent.

The various progressive movements of the parts in forming the stitch are shown *seriatim* in Figs. 12 to 16 and will be readily understood without further description.

The feed-dog 29 is operated in the manner customary in Union Special machines—that is, it is a four-motion feed operated from a crank-pin on the end of a driving-shaft and from a rocking frame 30 in rear of the machine with a cam 31 on the driving-shaft to give the rise and fall.

In machines of this character it is desirable to crowd the goods toward the needle before the stitching takes place to prevent puckering after the stitches have been passed through the fabric, and the feed-dog 29 is therefore inclined and so arranged that as it is lifted that part of it ahead of the needle will catch the goods first. To vary the inclination of the feed-dog, the following construction is provided: The block 32, to which the feed-dog is secured, is pivoted on a screw-bolt 33, attached to the rocking arm 34, said block being provided near its lower end with an internal socket 35 with a slot opening downwardly, and fitting in this socket 35, which is ball-shaped, is a ball 36 on the end of the rod 37, which projects to the rear of the machine and is provided with a suitable thumb-nut 38, said rod being screw-threaded, as at 39, and passing through a screw-threaded projection 40 on the rocking arm 34, so that by manipulation of the thumb-nut the feed-dog-supporting block may be swung on its pivot to vary the inclination of the feed-dog with respect to the line of the cloth-plate.

In a machine of this character it is desirable to provide a trimming device which shall act ahead of the stitch-forming mechanism to trim off the edges of the fabric or fabrics to prepare the said edge for the reception of the stitches, and in the present machine the trimmer comprises an upper movable knife and a lower coöperating stationary knife, which two knives when brought together having a shearing action upon the goods. Briefly, the trimmer is operated by a connecting-rod 41, embracing the ball-eccentric 42 on the driving-shaft and at its upper end having a ball connection with the end of an arm 43, which at its rear end is loosely sleeved on the rock-shaft 44, supported in bearing-lugs on the machine-frame. The upper trimmer-knife 45 is supported adjacent to the needle upon a second arm 46, which at its rear end is fixed to the rock-shaft 44. The forward end of the arm, which is loosely sleeved to the rock-shaft, is provided with shoulders 47, between which passes a pin 48, screw-threaded in a lug 49 on the trimmer-knife-supporting arm 46, said pin having on its upper end a manipulating-handle 50 and on its lower end having a head 51, adapted to engage the shoulders referred to. This pin is screw-threaded and so arranged that when the handle is moved to the right the pin will be screwed up slightly, and the head 51 on the lower end will bear against the lower edges of the shoulders, thus securely pinning the trimmer-knife-supporting arm to the other arm 43, which is loosely sleeved on the rock-shaft 44, and to which motion is imparted from the main shaft, thus giving the up-and-down movement to the trimmer-knife. When the two arms are not pinned together, the trimmer knife-supporting arm 46 with the rock-shaft may be swung out of engagement with the lower knife, and as it is swung up said arms come in engagement with a cam or projection 52 on the cloth-plate 53, which forces the rock-shaft longitudinally in its bearings and keeps the trimmer-knife out of engagement with the needle-clamping collar 54. The rock-shaft is journaled in lugs 55 56, above referred to, and toward the right-hand end of the machine is reduced in size within the barrel 60 or provided with an annular shoulder 57 just within the enlarged portion of the lug, and upon this reduced end 58 is placed a spring 59, engaging the head or shoulder 57. The barrel or enlarged part 60 of the lug 56 is screw-threaded to receive a hollow bolt 61, having a thumb-screw 62 on the end and provided also with a set-nut, so as to vary the tension of the spring. This spring keeps the rock-shaft with the upper trimmer-knife normally pressed up to the stationary trimmer-knife.

As herein shown, the mechanism for shifting the needle-head consists of a lever 63, pivoted upon a stud 64, projecting rearwardly from the lug 65 beneath the gooseneck C of the machine. One arm of this lever 63 extends toward the head of the machine and is provided with a fork 66 at its forward end, which engages a flat pin 67, supported in a head 68, fastened to a lug 69 on the needle-bar gate or frame. This flat pin is inclined so that as the forward end of the lever moves up or down it has a wedging action against the inclined pin and oscillates the needle-bar gate or frame. The opposite arm 70 of the lever 63 extends toward the right-hand end of the machine and is connected at its outer end with a treadle-arm 71, the lower end of which is of course placed within reach of the foot of the operator. Near its outer end this lever-arm has a head 72, through which projects a bolt 73, and an oppositely-extending bolt 74 is threaded through the lower lug 75 on the machine-frame. Between the head of the lever-arm and the lug on the yoke is a spring 76, which keeps the needle-bar gate or frame in normal position, herein shown as making the narrower seam. Passing through the upper lug 77 on the yoke is an adjusting stop-screw 78, by varying which the normal position of the needle-bar gate or frame may be varied, thus varying also the width of the seam. This lever 63 has a member 79, which engages the forked end 80 of the pivoted cast-off plate or arm 81 to vary the point at which the casting off of the looper-thread from the shoulders on the swinging fingers 82 takes place. This mechanism will be hereinafter more fully described in connection with the device for controlling the looper-thread.

The present machine also includes novel take-ups and pull-offs, one for the needle-thread and one for the looper-thread, and we will now describe the needle-thread pull-off and slack-controller, which forms the subject-matter of a separate application filed by Lansing Onderdonk on the 9th day of November, 1901, Serial No. 81,766, but which as it forms an important part of this machine is herein described, as is also the looper-thread take-up, which is, *per se*, the invention of Russel G. Woodward and is described and claimed in an application filed by him on the 9th day of November, 1901, Serial No. 81,769. This take-up and pull-off devices should also be automatically adjusted as the needle-head is shifted in order to bring the purl on the edge of the goods, and the specific mechanism for accomplishing this result is the invention of the said Russel G. Woodward.

Referring now particularly to Figs. 2 and 3 of the drawings, we have attached to the head or block 5, in which the upper end of the looper-shaft M is secured, a plate 83, projecting forward toward the front of the machine into a path between a stationary but adjustable eyelet 84 on the gooseneck C of the machine and another pivoted eyelet 85, which has a link connection 86 with the needle-bar head or gate. The forward end of the arm or plate 83, which is on the looper-supporting head, is provided with an eye or opening 87, through which the thread is guided between said two eyelets 84 85. From the pivoted eyelet above referred to the thread is guided to another stationary eyelet 88 on the upper needle-bar lug, and from there to the eye of the needle in the usual way. The action of this needle-thread take-up is as follows: Assuming the needle to be in its raised position and just about to start downward, the needle at that time has passed into the needle-loop. As the looper moves forward to carry its thread into position to be engaged by the needle in its descent the forward end of the eyeleted arm which moves with the looper-shaft passes beyond the pivoted eyelet above referred to, which pivoted eyelet is of course in operative position on the machine and pulls off thread sufficient for the needle to use up in its downward movement. When this amount has been pulled off, the looper meanwhile receding, said pull-off arm 83 moves back toward its normal position, and when the needle begins to ascend the eyeleted pull-off begins to pass out of the plane of the stationary eyelet on the gooseneck, and therefore takes up the slack in the needle-thread caused by the ascent of said needle, thus enabling all the superfluous thread to be taken out and the stitch to be properly drawn up. To allow for an increase of the thread pulled off and also for an increase in the amount of slack controlled, not only may the eyelet 84 be adjustable, but also the eyelet 85; but to allow for an increase of the thread pulled off when it is desired to make a wider seam—that is, to stitch farther from the trimmed-off edge than in normal position—the pivoted eyelet, above referred to, is provided, which, as shown, is pivoted, as at 89, and at its lower end is connected by the link 86 with the upper needle-bar lug. When the needle-bar gate or frame with the needle is shifted by means of the mechanism described to take a wider bite into the goods by means of this link connection, the upper end of the pivoted arm carrying the eyelet is swung toward the standard of the machine, and thus as the forward movement of the looper takes place more thread will be pulled off than when the needle-bar gate is in the normal position shown in the drawings.

Referring also to Figs. 2 and 3 and also to Figs. 6 and 7, we will now describe the looper-thread take-up. Secured to the upper end of the upper arm 11 of the bell-crank lever hereinbefore referred to are two forwardly-projecting fingers or arms 82, having shoulders 90, which arms extend between two stationary eyelets 91 upon the machine-frame, through which stationary eyelets the looper-thread is guided. In a plane between these fingers or arms is a cast-off plate or cam 92, pivoted, as shown, to the machine-frame and having its lower end engaging, through the forked arm 80 and projection 79, the mechanism which shifts the needle-head. As the two fingers or arms move forward they engage the looper-thread, which extends between the stationary eyelets and pull off from the spool thread until such time as the upper edge of the cast-off plate or cam forces the thread out of engagement with the shoulders on the fingers or arms, thus releasing the thread. This forward movement of the fingers or arms to pull off the thread from the spools takes place while the looper is moving out of the needle-loop, so that when the looper begins to return to move into the needle-loop it has sufficient slack thread supplied it to form the stitch. When the needle-head is shifted to make a wider seam, the upper edge of the cast-off plate or arm is swung downward, so that in the forward movement of the fingers or arms the thread will not be cast off from the shoulders as quickly as when the cast-off plate or arm is in normal position, and therefore more thread is supplied to the looper, thus allowing for greater width of seam.

The presser-foot 93 on this machine is of novel construction and is covered in an application filed by us on the 23d day of July, 1902, Serial No. 116,613. The foot portion 94 is hinged to the presser-foot shank in the usual way and is depressed by a spring 95, which bears on the front end and is attached to a screw 96, passing through an arm 97, projecting from the presser-foot shank. The tongue 98, over which the stitches are formed, does not partake of the rocking movement of the bottom or shoe of the foot, but is rigidly attached by the screw 99 to the presser-foot shank. Upon the forward end of the presser-foot a hem-guide 100 is provided. It will be seen that the forward spring-pressed end of the presser-foot coacts with the inclined feed-dog and that in the operation of the machine stitches are formed over the tongue and fed off the same in the feeding movement.

As herein shown, the hem-guide 100 is secured to the presser-foot, as shown clearly in Fig. 17, and is adjustable laterally by means of the set-screw $x$. In the use of this particular hem-guide 100, secured to the presser-foot, the folded edge of the fabric to be overseamed will be guided by the vertical edge thereof, while the part of the fabric to be trimmed off will project beyond the lower edge of the said edge-guide, and as the goods pass to the trimmer this outer edge will be trimmed off. This is clearly shown in Fig. 18. It will be understood, however, that so far as the invention is concerned we do not wish to be limited in all respects to the guide located upon the presser-foot, for while this is a convenient arrangement for certain kinds of work we wish to cover upon this character of machine means for adjusting the needle-bar and its needle laterally with respect to the line of feed of a guide located in front of the needle and located in advance of the space which is included between the extremes of lateral adjustment of said needle. Of course the guide might be made integral with the presser-foot, but, as herein shown, is separate therefrom, or it may be attached to another part of the machine, or it may be constructed like any of the well-known forms of hemmers, the object of the invention in this respect being, as above stated, to provide in connection with the adjustment of the needle laterally to regulate its bite into the fabric a guide for the edge of the hem fold, leaving the part to be trimmed off projecting beyond the line of the guide and needle in order that the edge may be properly prepared for the reception of the binding-stitches.

It will be understood that we do not wish to limit ourselves to a special construction of needle-bar-supporting gate or frame, as the needle may be supported in such a way as to have a swinging or pendulum movement; but this is not deemed necessary to be herein illustrated.

The matters herein shown and described, but not claimed, but yet which are novel, form the subjects-matter of other applications filed by us individually—for example, the looper-movement itself, filed by Lansing Onderdonk November 9, 1901, Serial No. 81,761; the precise mechanism shown for shifting the needle-bar gate or frame toward or away from the trimmer, filed by Russel G. Woodward November 9, 1901, Serial No. 81,771; the automatic means for varying the amount of thread pulled off to supply both the needle and looper, filed by Russel G. Woodward November 9, 1901, Serial No. 81,769; the feeding mechanism *per se*, shown in patent issued Russel G. Woodward, No. 802,789, October 24, 1905, and possibly other features; but the machine herein shown, described, and claimed, including the particular combination and arrangement of the stitch-forming elements and various other combinations, are the joint invention of us two and have been jointly invented and combined by us; but the present machine represents what we think is a high development, growing out of a long series of experiments, and some of the particular features, so far as construction is concerned, have been invented by us individually; but these particular features are simply shown herein as best examples of means for accomplishing the same ends which we accomplish by other mechanisms invented by us jointly, but which did not prove to be so practical as those herein illustrated.

Various minor modifications and changes in the constructions of parts of this machine may be made without departing from the spirit of our invention.

Having thus described our invention, what we claim as new, and desire to secure by Letters Patent, is—

1. In an overseaming sewing-machine, the combination with a needle and its operating mechanism, of a looper mounted above the work-support and oscillating in the direction of its length about an axis which is substantially vertical with respect to the work-support, and means independent of the needle-operating mechanism for operating said looper, whereby said looper passes through loops of needle-thread, and carries its own thread into position to be engaged by the needle in its descent, and a spreader or looping-hook with means for operating it to cause it to take loops of needle-thread from beneath the work-support and carry them into position to be entered by said thread-carrying looper; substantially as described.

2. In an overseaming sewing-machine, the combination with a needle, a needle-bar and its operating mechanism, of a curved looper mounted on an upright shaft above the bed-plate of the machine at one side the needle-bar, and arranged to pass through loops of needle-thread above the work, and a spreader or loop-taking hook, with means for operating it to cause it to take loops of needle-thread from beneath the work-plate, carry them above the work-plate and hold them in position to be entered by the said thread-carrying looper; substantially as described.

3. In an overseaming-machine, the combination with a needle and its operating mechanism, of a looper oscillating in the direction of its length about a vertical axis from a point in rear of the needle around outside the edge of the material to a point where its thread will be engaged by the needle in its next descent, means independent of the needle-operating mechanism for giving said movement to the looper and a spreader or loop-taking hook with means for operating it, to cause it to take loops of needle-thread from beneath the work-plate, carry them above the work-plate and hold them in position to be entered by said looper; substantially as described.

4. In a sewing-machine for making an overseaming-stitch, a thread-carrying curved looper mounted and operating entirely above the cloth-plate and operating about an axis above said cloth-plate, a needle with means for operating it, and a spreader or looping-hook pivotally mounted on double cranks below the work-plate, and having a movement from below to one side the needle up over the edge of the cloth-plate, to carry the needle-loop into the path of the looper; substantially as described.

5. In an overseaming sewing-machine, the combination with a needle and its operating mechanism and a movable frame or support therefor, a thread-carrying looper, with means for oscillating it to cause it to pass through loops of needle-thread above the work, a spreader or looping-hook, with means for operating it to cause it to take loops of needle-thread from below the work-plate, carry them above the work-plate and hold them in position to be entered by the said thread-carrying looper, and means for shifting the movable frame or support laterally; substantially as described.

6. In an overseaming sewing-machine, the combination with a needle and its operating mechanism and a movable frame or support therefor, a thread-carrying looper, with means for oscillating it to cause it to pass through loops of needle-thread above the work, a spreader or looping-hook, with means for operating it to cause it to take loops of needle-thread from below the work-plate, carry them above the work-plate and hold them in position to be entered by the said thread-carrying looper, and means for shifting the movable frame or support laterally, and means for holding the same in adjusted position; substantially as described.

7. In an overedge sewing-machine, the combination with a needle and its operating mechanism, a looper coöperating therewith to form stitches, and a loop-taking device arranged to seize a loop of needle-thread below the cloth-plate and carry it into position to be engaged by the looper, a trimmer arranged in advance of the needle for preparing the edge of the goods for the overseaming-stitches, with means for shifting the working position of the needle with respect to the edge, whereby the width of the seam may be varied; substantially as described.

8. In an overedge sewing-machine, the combination with a needle and its operating mechanism, a looper coöperating therewith to form stitches, and a loop-taking device arranged to seize a loop of needle-thread below the cloth-plate and carry it into position to be engaged by the looper, a trimmer arranged in advance of the needle for preparing the edge of the goods for the overseaming-stitches, with means for shifting the working position of the needle with respect to the edge, whereby the width of the seam may be varied; means for automatically returning the needle to normal position; substantially as described.

9. In an overedge sewing-machine, the combination with a needle and its operating mechanism, a looper coöperating therewith to form stitches, and a loop-taking device arranged to seize a loop of needle-thread below the cloth-plate and carry it into position to be engaged by the looper, a trimmer arranged in advance of the needle for preparing the edge of the goods for the overseaming-stitches, with means for shifting the working position of the needle with respect to the edge, whereby the width of the seam may be varied, means for automatically returning the needle to normal position, and stops for limiting the lateral shift of said needle; substantially as described.

10. An overedge sewing-machine having a feeding mechanism moving in a defined path, a needle with means for vertically reciprocating it to cause it to pass rows of loops in a continuous line parallel to the edge of the seam, a trimmer arranged in advance of the needle for preparing the edge of the goods, coöperating stitch-forming mechanism including means for depositing threads around the edge of the material to be secured by the needle, and means for shifting the needle laterally with respect to the edge of the seam; substantially as described.

11. An overseaming sewing-machine having suitable stitch-forming mechanism including a needle with means for reciprocating it vertically to deposit a continuous row of loops within the edge of a fabric, devices coöperating with the needle to deposit threads around and over the edge of the fabric to be secured by the needle, a trimmer adapted to trim off the material beyond the line of stitching, means for adjusting the needle laterally to vary its working position with respect to the edge of the fabric, and a presser-foot provided with a guide, whereby a fabric in which a hem has been turned may be guided by said guide with the edge to be trimmed off projecting beyond the same, and the edge of the goods overseamed; substantially as described.

12. An overseaming sewing-machine, having suitable stitch-forming mechanism, including a needle with means for reciprocating it vertically to deposit a continuous row of loops within the edge of a fabric, devices coöperating with the needle to deposit threads around and over the edge of the fabric to be secured by the needle, a trimmer adapted to trim off the material beyond the line of stitching, means for adjusting the needle laterally to vary its working position with respect to the edge of the fabric, a guide located in front of the needle, and within the space bounded by the two parallel planes which include the extremes of lateral adjustment of the needle; substantially as described.

13. An overseaming sewing-machine, having suitable stitch-forming mechanism, including a needle with means for reciprocating it vertically to deposit a continuous row of loops within the edge of a fabric, devices coöperating with the needle to deposit threads around and over the edge of the fabric to be secured by the needle, a trimmer adapted to trim off the material beyond the line of stitching, means for adjusting the needle laterally to vary its working position with respect to the edge of the fabric, a guide located in front of the needle and adjustable within the space bounded by the two parallel planes which include the extremes of lateral adjustment of the needle; substantially as described.

14. A sewing-machine for making overedge-stitches, comprising a needle and means for reciprocating it vertically to cause it to deposit a continuous row of loops within the edge of the fabric, a thread-carrying looper arranged to pass through loops of needle-thread above the work, a spreader or looping-hook with means for operating it to cause it to take loops of needle-thread from beneath the work-plate, carry them above the work-plate, and hold them in position to be entered by the said thread-carrying looper, means for shifting the working position of the needle laterally, and a guide arranged in front of the needle; substantially as described.

15. In a sewing-machine for making irregular or overedge stitches, and including a reciprocating needle adapted to deposit a continuous row of loops within the edge of the fabric and coöperating stitch-forming mechanism, a presser-foot, and a trimmer acting in advance of the stitch-forming mechanism to prepare the edge of the goods, means for shifting the working position of the needle laterally with respect to the trimmer, and a presser-foot having a lateral slot to allow for the movement of the needle when shifted laterally from the trimmer.

In testimony whereof we affix our signatures in presence of the witnesses.

LANSING ONDERDONK.
RUSSEL G. WOODWARD.

Witnesses to signature of L. Onderdonk:
W. H. MOYER,
M. VAN WAGNER.

Witnesses to signature of R. G. Woodward:
JNO. C. BEHRER,
MORTON MCNEIL.